March 7, 1933. M. CENTENO V. Re. 18,761

TELEVISION APPARATUS

Original Filed Feb. 21, 1930 3 Sheets-Sheet 1

MELCHOR CENTENO V.
INVENTOR

BY Victor J. Evans & Co.
ATTORNEY

TELEVISION APPARATUS

Original Filed Feb. 21, 1930 3 Sheets-Sheet 2

Fig. 7.a

MELCHOR CENTENO V.
INVENTOR

BY Victor J. Evans & Co.
ATTORNEY

March 7, 1933. M. CENTENO V. Re. 18,761

TELEVISION APPARATUS

Original Filed Feb. 21, 1930 3 Sheets-Sheet 3

MELCHOR CENTENO V.
INVENTOR

BY Victor J. Evans & Co.
ATTORNEY

Reissued Mar. 7, 1933

Re. 18,761

UNITED STATES PATENT OFFICE

MELCHOR CENTENO V., OF NEW YORK, N. Y.

TELEVISION APPARATUS

Original No. 1,873,926, dated August 23, 1932, Serial No. 430,375, filed February 21, 1930. Application for reissue filed January 4, 1933. Serial No. 650,192.

This invention relates to television systems and more particularly to the electrical transmission and reproduction of images either by wire or by carrier waves produced in the ether by means of a suitable radio transmitting system.

The broad object of the present invention is to provide an improved system of television whereby transmission and reception of images may be carried on simultaneously and by means of simple apparatus arranged in a novel manner as unitary structure.

Another broad object is to provide a novel apparatus adapted to be used in a system for the transmission or reception of motion pictures.

Another object is to provide a simple and efficient apparatus adapted for general use in the television art.

A more specific object is to provide an improved mounting and means for actuation of the vibrating mirror commonly used in connection with television systems and apparatus.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

Figure 7:
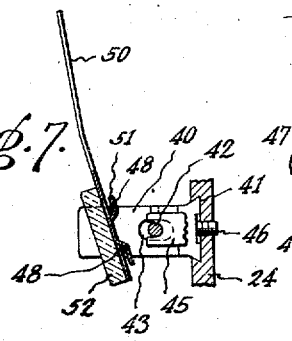
Fig. 7 is an enlarged vertical section on the line 7—7 of Fig. 3 and illustrates in detail the manner in which the vibrating mirror is mounted upon the supporting string.

Fig. 7*a* is a back view of the mounting for the member supporting the vibrating mirror.

Figure 3:
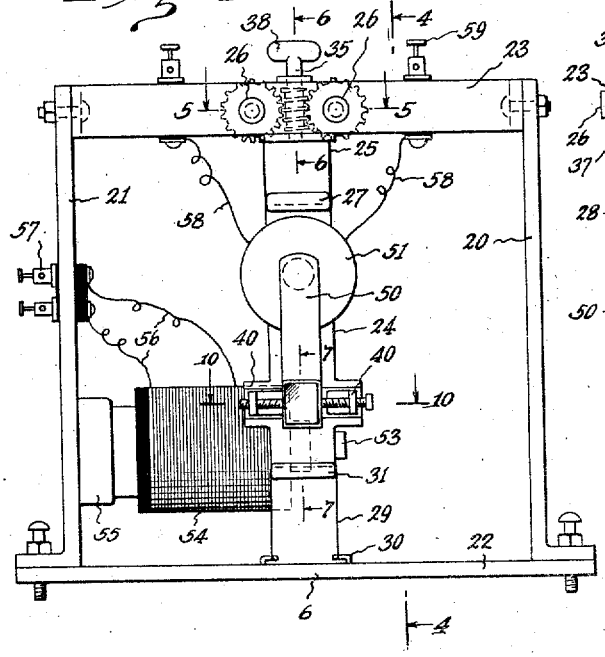
Fig. 3 is a vertical elevation of the improved apparatus for use in connection with the systems illustrated in Figs. 1 and 2, and illustrates the manner in which the vibrating mirror is actuated.
Figure 8:
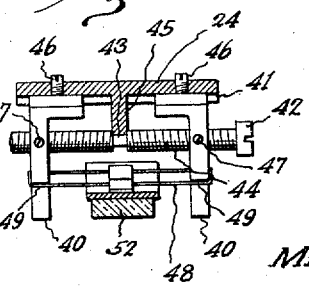
Figure 8:
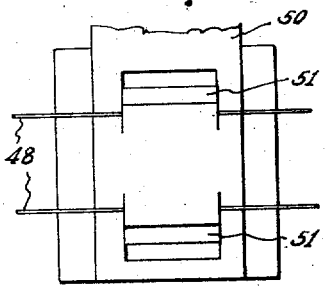

Fig. 8 is a horizontal section taken on the line 8—8 of Fig. 3.

Figure 9:
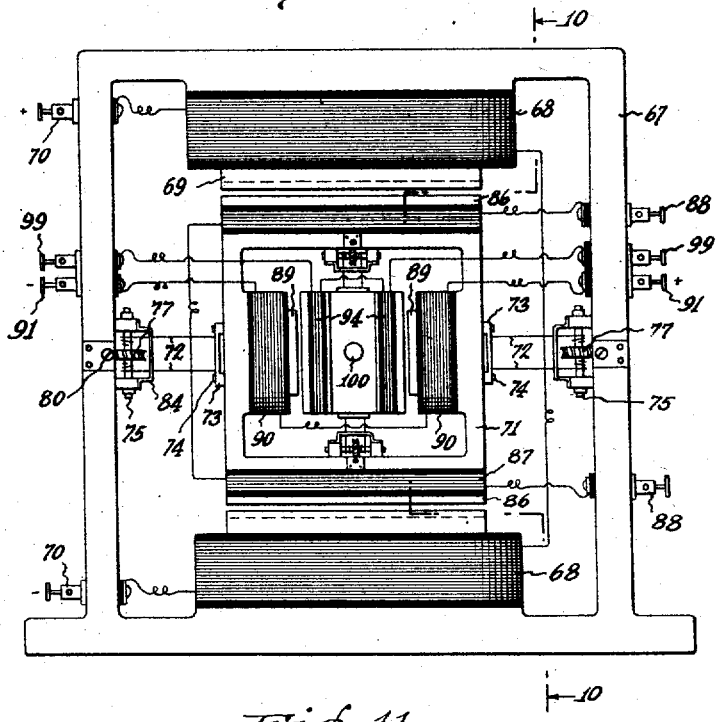

Fig. 9 is a vertical elevation illustrating a modification in the construction of the apparatus illustrated in Figs. 3 to 8.

Figure 10:
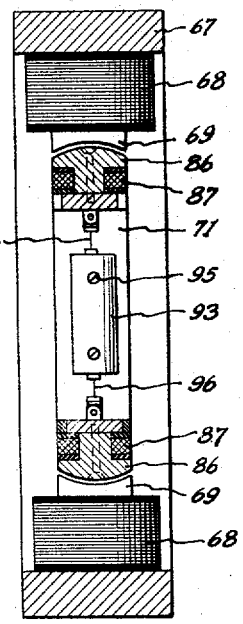

Fig. 10 is a vertical section on the line 10—10 of Fig. 9.

Figure 11:
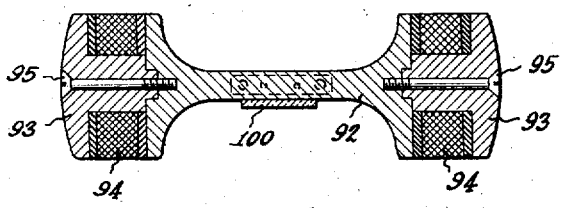
Figure 12:
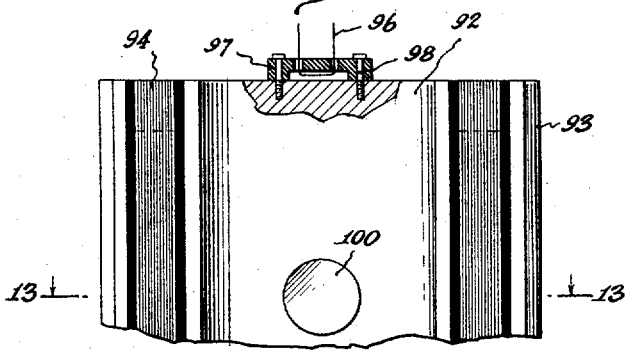

Fig. 11 is an enlarged horizontal section through the center of the armature which carries the mirror, taken on the line 11—11 of Fig. 12.

Fig. 12 is an enlarged vertical elevation of the upper end of the armature which carries the mirror and clearly illustrates the manner of attaching the supporting strings to the armature.

Figure 13:
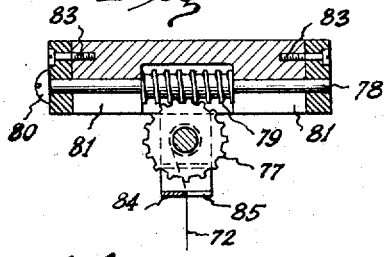
Figure 14:
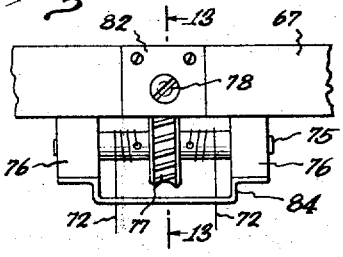

Fig. 13 is an enlarged section taken on the line 13—13 of Fig. 14 and illustrates the means for tightening the supporting strings for tuning purposes.

Fig. 14 is an enlarged view of the means for tightening the supporting strings for tuning purposes.

Figure 4:
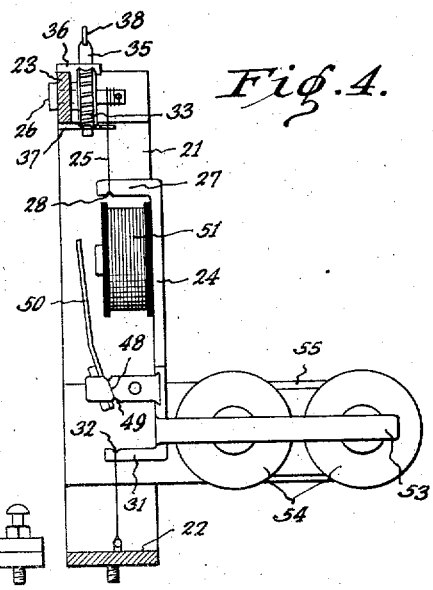
Fig. 4 is a vertical section on the line 4—4 of Fig. 3.
Figure 5:
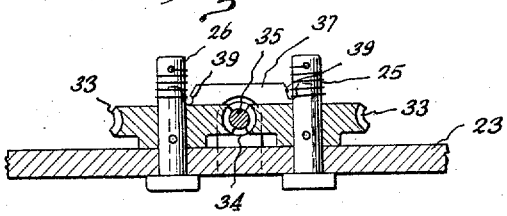
Fig. 5 is an enlarged horizontal section on the line 5—5 of Fig. 3 showing the manner in which the supporting strings are tightened for tuning purposes.
Figure 6:
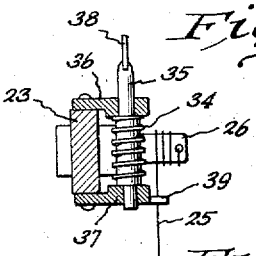
Fig. 6 is an enlarged vertical section on the line 6—6 of Fig. 3.

The numerals 20 and 21, Figs. 3 and 4, represent frame pieces mounted upon a base 22 and supporting a cross-bar 23 between their upper extremities. A frame 24, having the general shape illustrated in Figs. 3 and 4, is supported within the frame work formed by the base 22, frame pieces 20, 21 and cross-bar 23 by means of a wire 25, the ends of which are wound on shafts 26 journaled in the cross-bar 23. The wire 25 passes over a projection 27 formed in the upper part of the frame 24 and is prevented from slipping off the frame by a groove 28 on the under side of the projection. A second wire 29, the ends of which are fastened to suitable lugs 30 carried by the base 22, passes over a projection 31 formed in the lower part of the frame 24 and is prevented from slipping off the projection 31 by a groove 32.

The shafts 26, as stated, are journaled in the cross-bar 23 and each has fastened thereon a worm wheel 33 adapted to be driven by a worm 34 integral with a vertical shaft 35. The shaft 35 is journaled in member 36, 37 extending from the cross-bar 23 and is provided with a thumb-piece 38 for the purpose of turning the shaft. The ends of the wire 25 pass over notches 39 formed in the edge of the member 37 and also through diametrical holes in the shafts 26, each end of the wire being wrapped several times around the shaft so as to ensure a positive fastening to the shaft. It will be clear from the foregoing description that turning of the thumb-piece 39 in the right direction will cause the shafts 26 to be rotated and tighten up both of the wires 25 and 29.

Adjustably mounted upon the frame 24 are two arms 40 which are slidable in dovetail slots 41 formed in the frame 24. A screw 42 having a groove 43 and threaded portions 44 co-operates with the arms 40 in such a manner that the arms are moved in opposite directions whenever the screw is turned this result being accomplished by cutting a left handed thread on the left end of the screw (Fig. 8) and a right handed thread on the right end of the screw, the respective threads on the screw 42 mating with similar threads on the arms 40. A lug 45 forming part of the frame 24 is provided with a notch co-operating with the groove 43 so that turning of the screw 42 will cause the arms to be moved equal distances toward or away from the central lug 45. Screws 46, 47 are provided for the purpose of locking the arms 40 and screw 42, respectively, against movement after they have been adjusted.

Extending between the arms 40 is an endless wire 48 which passes over the free ends of the arms and is prevented from slipping off the ends of the arms by notches 49 cut in the arms. The lengths of wire lying between the arms 40 are parallel to each other and support an upwardly extending flat strip of metal 50, the upper end of which is capable of being vibrated by a magnet 51 carried by the frame 24. The lower end of the member 50 is stamped so as to provide tongues 51 which are pressed over the wire 48, thereby holding the member 50 firmly in place. A mirror 52 is mounted upon the lower end of the member 50 and may be either square or round in shape. The mirror 52 is adapted to receive a beam of light from a source such as a powerful arc light placed below an imaginary horizontal line passing through the center of the mirror. The reflected beam is required to be reflected so as to be capable of sweeping vertically through a small angle above and below the imaginary horizontal line just mentioned and for that reason the wire 48 is disposed so that the mirror is inclined somewhat from a vertical position.

The frame 24 is provided with an arm 53 which acts as the armature of a magnet 54 carried by an arm 55 integral with and extending from the frame piece 21. Suitable leads 56 from the magnet 54 connected to binding posts 57 furnish a means for readily connecting the magnet 54 with external circuits. Similar leads 58 connected to the magnet 51 and the binding posts 59 provide for connecting the magnet 51 to an external circuit.

The wires 25, 29 and 48 will hereinafter be termed "strings" since they are adapted to be tightened to tune the entire apparatus to certain definite frequencies of vibration for a purpose now to be described.

The magnet 54 is energized by means of an alterating current of low frequency, say ten cycles per second, the strings 25 and 29 being tightened by means of the thumb-piece 38 until the entire frame 24 and associated parts vibrate continuously about a vertical axis in resonance with the low frequency alternating current.

The magnet 51, on the other hand, is energized by a high frequency alternating current, say around 450 cycles per second and the string 48 tightened until the member 50 vibrates continuously about a horizontal axis and in resonance with the high frequency alternating current.

Figure 1:
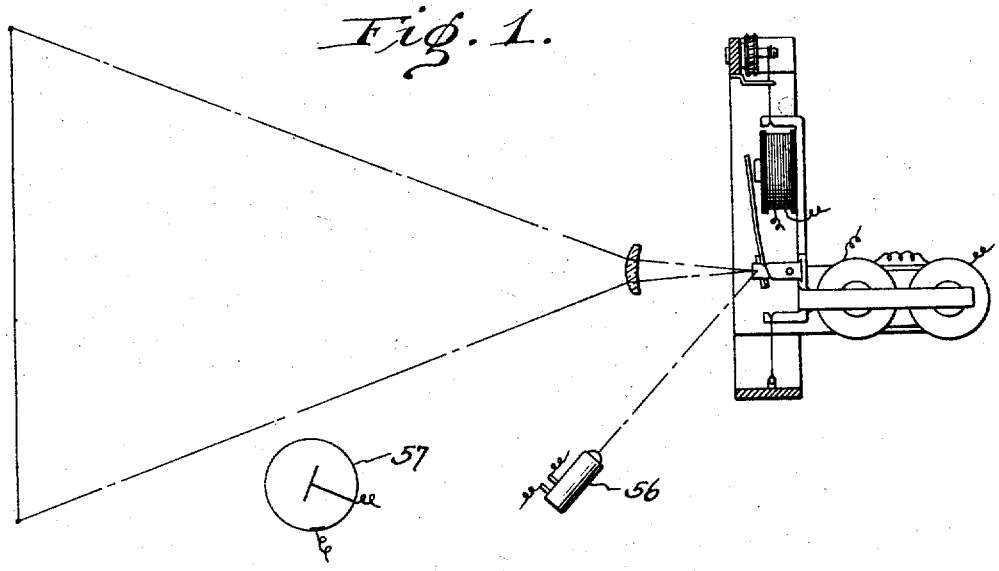
Fig. 1 is a diagrammatic view illustrating the manner in which the improved television apparatus embodying the present invention is applied to a system of transmission of images and the manner in which reception of the transmitted images is effected by the same apparatus.

When both of the magnets 54 and 51 have been energized and the strings properly adjusted to resonance with the respective energizing currents a beam of light projected upon the mirror 52 will be reflected and the reflected beam used in a television system to scan or trace a picture or object for transmission of an image in conjunction with a light sensitive medium such as a photo-electric cell; a similar apparatus to that just described being used at the receiving end of the system in conjunction with a source of light such as a neon lamp to trace an image identical with the picture or object. This arrangement is illustrated in Fig. 1 wherein the numeral 56 represents a source of light which would be an arc light when transmitting the image or a neon lamp when receiving a transmitted image. A photo-electric cell 57 or other light sensitive medium is used to transform the minute variations in the intensity of the light reflected from the picture or object into electrical impulses for transmission to the receiving apparatus there to be translated into an image of the picture or object.

Figure 2:
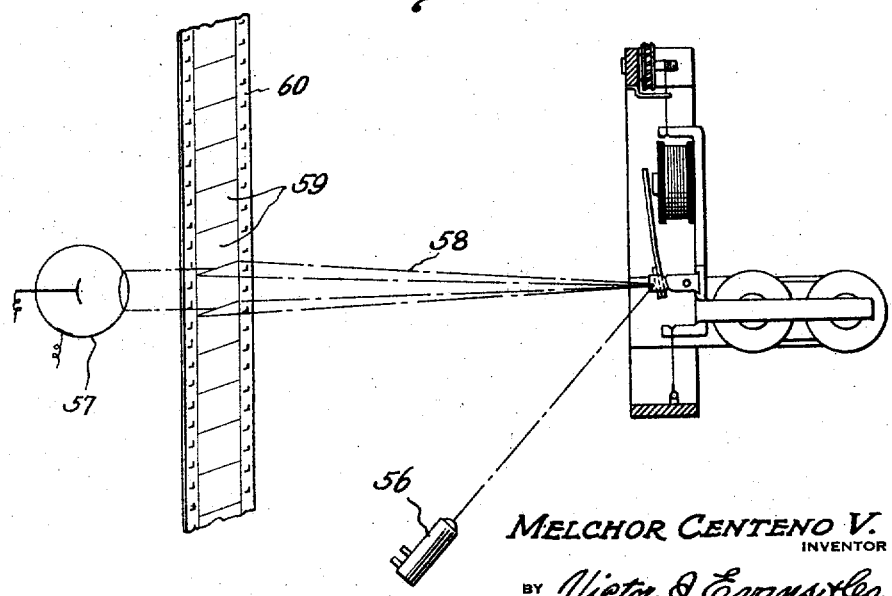
Fig. 2 is a diagrammatic view illustrating the manner in which motion pictures may be transmitted by means of the present invention.

The apparatus shown in Figs. 3 to 7*a* may also be used for transmitting and receiving motion pictures, such a system being illustrated in Fig. 2. The apparatus is arranged substantially as shown in the latter figure in which the reflected beam 58 from the light source 56 is directed upon the images 59 of the motion picture film 60 as they are successively moved into the field of the beam by an intermittent motion mechanism similar to that used in a standard motion picture projector or camera, the images on the film being moved into the field of the beam 58 at the rate of about sixteen images per second, each image being held stationary long enough for the beam 58 to scan or trace the entire image, a photo-electric cell 57 or other light sensitive medium being provided to convert the minute variations in the intensity of the light transmitted through the film into electrical impulses for transmission to the receiving apparatus. At the receiving end an arrangement similar to that illustrated in Fig. 1 may be used in connection with a neon lamp to convert the varying current from the photo-electric cell into a succession of images similar to the images in the film 60.

It will be clearly understood, of course, that for successful operation of the systems mentioned the mirrors at the transmitting and receiving ends of the system must be operated in exact synchronism with each other in order to successfully transmit a clear image of the picture or object.

Figs. 9 to 14 inclusive illustrate a modification in the construction of the apparatus illustrated in Figs. 3 to 7*a* inclusive. The numeral 67 represents a supporting frame which may be made as a unitary structure if desired. Mounted upon the upper and lower portions of the frame 67 are coils 68 which are energized from an external source of direct current. The coils 68 surround suitable pole pieces 69 so that when a direct current is flowing through the coils 68 a strong magnetic field is produced between the poles 69. The coils 68 are connected in series and, through the medium of binding posts 70, may be connected to the external source of direct current.

An armature 71 adapted to oscillate in the field produced between pole pieces 69, is supported by means of strings 72. Each of the strings 72 is attached to the armature 71 by members 73 which are provided with two holes through which the string passes, the string passing in one hole and out the other hole. The object of this construction is to permit the strings to slide freely in the members 73, the members 73 being attached to the armature by means of suitable screws 74. Each end of the strings 72 passes around and is attached to a shaft 75 which is journaled in suitable lugs 76 supported by the frame 67.

The shaft 75 is provided with a worm wheel 77 integral therewith while a shaft 78 provided with a worm 79 engaging the worm wheel 77 is adapted to be turned by means of a slotted head 80 for the purpose of tightening the strings.

The worm 79 lies within a cavity formed in the frame 67 while the shaft 78 lies in suitable slots 81 formed in the frame 67 and is held in place by slotted plates 82 attached to the frame 67 by screws 83. The object of this construction is to make it an easy matter to assemble and adjust the tightening mechanism for the strings. It will be clear that the worm 79 may be turned by means of a screw driver to tighten the string 72 by winding the ends of the strings over the shaft 75. In order to hold the strings in proper alignment a bridge 84 attached to the lugs 76 is provided and has formed therein suitable notches 85 in which the strings lie.

The armature 71 has supported thereon pole pieces 86 which hold coils 87 in place, the pole pieces 86 being separated from the pole pieces 69 by a small air gap. The coils 87 are connected in series and to suitable binding posts 88. The armature 71 also is provided with pole pieces 89 bearing coils 90, connected in series and to binding posts 91. The binding posts 91 are connected to an external source of direct current so as to maintain a strong magnetic field between the pole pieces 89.

Mounted within the strong magnetic field produced by the coils 90 is a second armature comprising a member 92 carrying pole pieces 93 and coils 94 surrounding the pole pieces, suitable screws 95 serving to hold the pole pieces upon the member 92. The member 92 is supported between the pole pieces 89 by means of strings 96, each of which is attached to the member 92 by means of a member 97, similar to the member 73, and fastened to the member 92 by means of screws 98. The means for attaching the strings 96 to the member 92 is alike in all respects to the means for attaching the strings 72 to the armature 71. The attaching means for strings 96 is clearly illustrated in Figs. 13 and 14 and these two figures will also clearly explain the method of attaching the strings 72 to the armature 71. Each of the strings 96 is tightened by means similar to the arrangement illustrated in Figs. 13 and 14, the tightening means being of a smaller size owing to the smaller space available and also so as to reduce the weight of the armature 71 as much as possible.

The coils 94 are connected in series to binding posts 99 and are energized by a high frequency alternating current of say 450 cycles per second. A mirror 100 is mounted upon the member 92 and preferably should be inclined somewhat from the vertical so that a beam of light directed upon the mirror from a source such as an arc lamp placed below and in front of the mirror will be reflected horizontally when both armatures are at rest.

The apparatus just described, illustrated in Figs. 9 to 14, may be used in the same manner and under the same circumstances in a television transmitting system utilizing a vibrating mirror for tracing an object or picture in connection with a photo-electric cell or it may be used in a television receiving system to trace an image transmitted by such a transmitting system. It will be understood, of course, that the vibrating mirror in the receiving system must vibrate in exact synchronism with the mirror in the transmitting system in order to secure a clear image.

In practice the coils 68 and 90 will be energized from an external source of direct current so as to maintain a constant field between the pole pieces 69 and 89 respectively. The coils 87 will be energized by an alternating current of a frequency of say ten cycles per second and the strings 72 will be tuned to bring the entire system carried by the armature 71 into resonance with the low frequency alternating current. Similarly, the coils 94 will be energized with an alternating current of a frequency of say 450 cycles per second and the strings 96 tuned to bring the central armature supported thereby into resonance with the high frequency alternating current. It will thus be seen when the apparatus has been properly tuned to resonance that the mirror 100 will be vibrated about one axis at a high frequency and also vibrated at a low frequency about another axis at right angles to the first, consequently a beam of light reflected from the mirror will make a large number of traces per second, ranging in the hundreds.

The apparatus may be used in any of the systems and arrangements shown in Figs. 1 and 2, and accomplishes exactly the same results as the apparatus shown in those figures diagrammatically and in greater detail in Figs. 3 to 7*a* inclusive.

In the foregoing description of the apparatus for vibrating the mirror reference has been made to the use of alternating current for providing the energizing current for the elements vibrating the mirror. It is pointed out that the present invention is not limited to the use of alternating current alone as pulsating direct currents might be used, the pulsating frequencies being the same as if alternating current has been used. Nor is it desired to limit the invention to the precise means for mounting and tightening the strings supporting the vibrating elements as other means for mounting and tightening the strings may be used equally well.

The principal advantage of the apparatus for vibrating the mirror herein described is the readiness and ease of adjustment made possible by the manner of mounting the vibrating parts by means of strings and the provisions for tightening the strings whereby each of the vibrating parts may be easily and conveniently tuned to resonance at any desired frequency of vibration.

Various modifications may be made in the systems and apparatus herein described and it is not desired to limit the scope of the invention to the precise arrangements shown in the drawings and described herein.

The hereinbefore described constructions and systems admit of considerable modification without departing from the invention; therefore, it is the wish not to be limited to the precise arrangements shown and described, which are as aforesaid, by way of illustration merely. In other words, the scope of protection contemplated is to be taken solely from the appended claims, interpreted as broadly as is consistent with the prior art.

What is claimed as new is:

1. In a television apparatus, a stationary frame, a movable frame disposed within the stationary frame, flexible suspension means for supporting the movable frame in the stationary frame, the latter being provided with an armature, a low frequency magnet supported in the stationary frame so as to project its field through the armature of the movable frame, a mirror, a high frequency magnet carried by the movable frame, an armature for the last said magnet, said armature being flexibly mounted in the movable frame and carrying said mirror.

2. In a television apparatus, a stationary frame, a movable frame disposed within the stationary frame, flexible suspension means for supporting the movable frame in the stationary frame, a low frequency magnet supported in the stationary frame, the movable frame having an armature in the field of said magnet, a tensioning member for said flexible suspension means, to vary the tension on the same to change the rate of vibration of the movable frame to accord with the frequency of the magnet, a high frequency magnet carried by the movable frame, and a mirror supported by the movable frame and having a member functioning as the armature of said high frequency magnet to vibrate the mirror when said high frequency magnet is energized.

3. In a television apparatus, a stationary frame, a movable frame disposed within the stationary frame, flexible suspension means for supporting the movable frame in the stationary frame, a low frequency magnet supported in the stationary frame, the movable frame having an armature in the field of said magnet, a tensioning member for said flexible suspension means, to vary the tension on the same to change the rate of vibration of the movable frame to accord with the frequency of the magnet, a high frequency magnet carried by the movable frame, and a mirror supported by the movable frame and having a member functioning as the armature of said high frequency magnet to vibrate the mirror when said high frequency magnet is energized, the axis of vibration of the mirror being angularly related to the axis of vibration of the movable frame.

4. In a television apparatus, a stationary frame, a movable frame disposed within the stationary frame, flexible suspension means for supporting the movable frame in the stationary frame, a low frequency magnet supported in the stationary frame, the movable frame having an armature in the field of said magnet, a tensioning member for said flexible suspension means, to vary the tension on the same to change the rate of vibration of the movable frame to accord with the frequency of the magnet, a high frequency magnet carried by the movable frame, and a mirror supported by the movable frame and having a member functioning as the armature of said high frequency magnet to vibrate the mirror when said high frequency magnet is energized, the axis of vibration of the mirror being angularly related to the axis of vibration of the movable frame, and the tensioning device for the suspension means for the latter consisting of worms in mesh with a common screw, and shafts with which the worms are connected, and the suspension means consisting of parallel flexible members connecting the movable frame to the stationary frame and the former to the said shafts, the latter being rotatably mounted in the movable frame.

5. In a television apparatus, a stationary frame, a movable frame disposed within the stationary frame, flexible suspension means for supporting the movable frame in the stationary frame, the latter being provided with an armature, a low frequency magnet supported in the stationary frame so as to project its field through the armature of the movable frame, a high frequency magnet carried by the movable frame, a mirror having a member disposed in the field of the high frequency magnet and acting as an armature for the same, and flexible suspension means for supporting said mirror in the movable frame.

6. In a television apparatus, a stationary frame, a movable frame disposed within the stationary frame, flexible suspension means for supporting the movable frame in the stationary frame, the latter being provided with an armature, a low frequency magnet supported in the stationary frame so as to project its field through the armature of the movable frame, a high frequency magnet carried by the movable frame, a mirror having a member disposed in the field of the high frequency magnet and acting as an armature for the same, and flexible suspension means for supporting said mirror in the movable frame and consisting of parallel strands, and adjustable means for varying the tension on said strands.

In testimony whereof I hereto affix my signature.

MELCHOR CENTENO V.